(12) United States Patent
Kiyokami et al.

(10) Patent No.: US 10,632,833 B2
(45) Date of Patent: Apr. 28, 2020

(54) VEHICLE DRIVE DEVICE

(71) Applicant: TOYOTA JIDOSHA KABUSHIKI KAISHA, Toyota-shi, Aichi (JP)

(72) Inventors: Hiroaki Kiyokami, Toyota (JP); Yota Mizuno, Nisshin (JP); Tatsuo Obata, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 27 days.

(21) Appl. No.: 16/171,705

(22) Filed: Oct. 26, 2018

(65) Prior Publication Data

US 2019/0128179 A1 May 2, 2019

(30) Foreign Application Priority Data

Oct. 27, 2017 (JP) ................................. 2017-208642

(51) Int. Cl.
| | |
|---|---|
| *B60K 6/405* | (2007.10) |
| *B60K 6/40* | (2007.10) |
| *B60K 6/445* | (2007.10) |
| *B60K 6/26* | (2007.10) |
| *F16H 57/04* | (2010.01) |

(52) U.S. Cl.
CPC ............... *B60K 6/405* (2013.01); *B60K 6/26* (2013.01); *B60K 6/40* (2013.01); *B60K 6/445* (2013.01); *F16H 57/0424* (2013.01); *F16H 57/0436* (2013.01); *F16H 57/0441* (2013.01); *B60Y 2200/92* (2013.01)

(58) Field of Classification Search
CPC ............. F16H 57/0424; F16H 57/0441; F16H 57/0436; B60K 6/405; B60K 6/40; B60K 6/44; B60K 6/445
See application file for complete search history.

(56) References Cited

U.S. PATENT DOCUMENTS

| | | | | |
|---|---|---|---|---|
| 8,653,704 | B2* | 2/2014 | Atarashi ................ | B60K 6/405 310/52 |
| 8,808,128 | B2* | 8/2014 | Sada ........................ | B60K 6/40 475/151 |
| 2010/0005925 | A1 | 1/2010 | Oomura | |
| 2010/0009765 | A1 | 1/2010 | Oomura | |
| 2012/0217122 | A1* | 8/2012 | Kasuya ................... | B60K 6/387 192/113.35 |
| 2014/0341757 | A1 | 11/2014 | Obata et al. | |

FOREIGN PATENT DOCUMENTS

| | | |
|---|---|---|
| CN | 101665082 A | 3/2010 |
| JP | H10-2285 A | 1/1998 |
| JP | 2013-117218 A | 6/2013 |
| JP | 2014-088906 A | 5/2014 |

* cited by examiner

*Primary Examiner* — Erin D Bishop
(74) *Attorney, Agent, or Firm* — Oliff PLC

(57) ABSTRACT

In a vehicle drive device, a case cover includes a cylindrical wall portion formed circumferentially in an outside space of a first rotating shaft and projecting toward the case parallel to an axial direction of the first rotating shaft, an oil pump includes a pump cover arranged in a space radially inside the wall portion and a pump chamber formed in a space radially inside the wall portion by the case cover including the wall portion and the pump cover to house the pump gear, and the wall portion includes a support portion disposed on the other axial end side of the first rotating shaft relative to the pump cover, having a bearing fitted thereto, and rotatably supporting a second rotating shaft via the bearing.

10 Claims, 8 Drawing Sheets

VEHICLE DRIVE DEVICE

This application claims priority from Japanese Patent Application No. 2017-208642 filed on Oct. 27, 2017, the disclosure of which is herein incorporated by reference in its entirety.

BACKGROUND OF THE INVENTION

Field of the Invention

The present invention relates to a vehicle drive device including an oil pump driven by a drive power source (a power source).

Description of the Related Art

There is well known a vehicle drive device including a first power source, a second power source, a first rotating shaft coupled to the first power source, a second rotating shaft coupled to the second power source, an oil pump driven by the first power source and having a pump gear coupled to the first rotating shaft on one axial end side of the first rotating shaft, a case opened at least on the one axial end side of the first rotating shaft and housing the second power source, and a case cover disposed to close an opened portion of the case. For example, this corresponds to a vehicle power transmission device described in Patent Document 1. Patent Document 1 discloses that by fixing a pump body provided with a cylindrical recess portion to the case cover via a plate by bolts, a pump chamber housing the pump gear is formed by the recess portion, and that the pump body rotatably supports a rotor shaft of a rotating machine serving as the second power source via a bearing.

CITATION LIST

Patent Document 1: Japanese Laid-Open Patent Publication No. 2014-88906

SUMMARY OF THE INVENTION

Technical Problem

To support the rotor shaft of the rotating machine, a reaction force from the rotating machine must be received. If the pump body supports the rotor shaft of the rotating machine via the bearing, the reaction force from the rotating machine is transmitted to the bearing, the pump body, and the case cover in this order. Therefore, the pump body requires strength and rigidity to support the rotating machine. Additionally, to ensure a sealing performance at mating surfaces of the pump body and the case cover, a seal member such as a plate must be disposed between the pump body and the case cover, or it is required to increase a fastening force for fixing the pump body and the case cover. This may result in an increase in size of the pump body, or a complicated structure for ensuring the sealing performance at the mating surfaces of the pump body and the case cover, or an increase in number of fasteners such as bolts used for fixing the pump body and the case cover.

The present invention was conceived in view of the situations and it is therefore an object of the present invention to provide a vehicle drive device capable of ensuring a sealing performance in an oil pump with a simple structure.

Solution to Problem

To achieve the above object, a first aspect of the present invention provides a vehicle drive device comprising: (a) a first power source; a second power source; a first rotating shaft coupled to the first power source; a second rotating shaft coupled to the second power source; an oil pump driven by the first power source and including a pump gear coupled to the first rotating shaft on one axial end side of the first rotating shaft; a case opened at least on the one axial end side of the first rotating shaft and housing the second power source; and a case cover disposed to close an opened portion of the case, wherein (b) the case cover includes a cylindrical wall portion formed circumferentially in an outside space of the first rotating shaft and projecting toward the case parallel to an axial direction of the first rotating shaft, wherein (c) the oil pump includes a pump cover arranged in a space radially inside the wall portion and a pump chamber formed in a space radially inside the wall portion by the case cover including the wall portion and the pump cover to house the pump gear, and wherein (d) the wall portion includes a support portion disposed on the other axial end side of the first rotating shaft relative to the pump cover, having a bearing fitted thereto, and rotatably supporting the second rotating shaft via the bearing.

A second aspect of the present invention provides the vehicle drive device recited in the first aspect of the invention, wherein the wall portion is provided with a first inner circumferential surface having the pump chamber formed in a space on the radially inner side and a second inner circumferential surface disposed next to the first inner circumferential surface on the other axial end side of the first rotating shaft relative to the first inner circumferential surface, having a larger diameter than the first inner circumferential surface, and housing the pump cover in a space on the radially inner side.

A third aspect of the present invention provides the vehicle drive device recited in the second aspect of the invention, wherein the support portion is a third inner circumferential surface of the wall portion to which an outer circumferential surface of the bearing is fitted, and wherein the second inner circumferential surface has a smaller diameter than the third inner circumferential surface.

A fourth aspect of the present invention provides the vehicle drive device recited in the second or third aspect of the invention, wherein the pump cover is fixed by a bolt to a stepped portion of the wall portion formed by a difference between the diameters of the first inner circumferential surface and the second inner circumferential surface.

A fifth aspect of the present invention provides the vehicle drive device recited in the second aspect of the invention, wherein the support portion is a third inner circumferential surface of the wall portion to which an outer circumferential surface of the bearing is fitted, and wherein the pump cover is fixed by the bearing that is fitted to the third inner circumferential surface such that the bearing presses the pump cover against a stepped portion of the wall portion formed by a difference between the diameters of the first inner circumferential surface and the second inner circumferential surface.

A sixth aspect of the present invention provides the vehicle drive device recited in any one of the first to third aspects of the invention, wherein the pump cover is fixed by being fitted to an inner circumferential surface of the wall portion.

A seventh aspect of the present invention provides the vehicle drive device recited in any one of the first to sixth aspects of the invention, wherein the case cover has an intake oil passage formed in communication with an intake port of the oil pump to allow an oil sucked by the oil pump to flow therethrough and a discharge oil passage formed in communication with a discharge port of the oil pump to allow an oil discharged by the oil pump to flow therethrough.

An eighth aspect of the present invention provides the vehicle drive device recited in any one of the first to seventh aspects of the invention, wherein the second power source is a rotating machine, and the second rotating shaft is a rotor shaft of the rotating machine.

A ninth aspect of the present invention provides the vehicle drive device recited in any one of the first to seventh aspects of the invention, further comprising an engine, an electric transmission mechanism including a differential mechanism coupled to the engine in a power transmittable manner and a first rotating machine coupled to the differential mechanism in a power transmittable manner such that a differential state of the differential mechanism is controlled through control of an operating state of the first rotating machine, and a second rotating machine coupled to an output rotating member of the electric transmission mechanism in a power transmittable manner, wherein the first power source is the engine, the second power source is the first rotating machine arranged coaxially with the first rotating shaft, the second rotating shaft is a rotor shaft of the first rotating machine, and the second rotating machine is arranged on an axis different from the first rotating shaft.

A tenth aspect of the present invention provides the vehicle drive device recited in any one of the first to seventh aspects of the invention, further comprising an engine, an electric transmission mechanism including a differential mechanism coupled to the engine in a power transmittable manner and a first rotating machine coupled to the differential mechanism in a power transmittable manner such that a differential state of the differential mechanism is controlled through control of an operating state of the first rotating machine, and a second rotating machine coupled to an output rotating member of the electric transmission mechanism in a power transmittable manner, wherein the first power source is the engine, the second power source is one rotating machine that is either one of the first rotating machine and the second rotating machine which are arranged coaxially with the first rotating shaft, and the second rotating shaft is a rotor shaft of the one rotating machine.

Advantageous Effects of Invention

According to the first aspect of the invention, the oil pump allows the case cover including the wall portion and the pump cover arranged in the space radially inside the wall portion to form the pump chamber housing the pump gear in the space radially inside the wall portion, while the wall portion formed in the case cover includes the support portion rotatably supporting the second rotating shaft via the bearing, and therefore, the pump cover does not receive the weight of the second power source or the reaction force from the second power source due to supporting the second power source, and seal surfaces between the case cover and the pump cover are present inside the entire case formed by the case cover, the case, etc. Thus, the sealing performance of the oil pump can be ensured by a simple structure.

According to the second aspect of the invention, since the wall portion is provided with the first inner circumferential surface with which the pump chamber is formed on the radially inner side thereof and the second inner circumferential surface disposed next to the first inner circumferential surface and having a larger diameter than the first inner circumferential surface with the pump cover housed in the space on the radially inner side thereof, the oil pump is properly configured with a structure in which the pump cover does not receive the reaction force from the second power source etc.

According to the third aspect of the invention, since the support portion of the wall portion is the third inner circumferential surface of the wall portion into which the outer circumferential surface of the bearing is fitted, and the second inner circumferential surface has a smaller diameter than the third inner circumferential surface, the oil pump is properly configured with a structure in which the pump cover does not receive the reaction force from the second power source etc.

According to the fourth aspect of the invention, since the pump cover is fixed to the stepped portion of the wall portion by the bolts and therefore has a structure in which the bolts used for fixing the pump cover do not receive the reaction force from the second power source etc., the number of the bolts can be reduced, or the bolts can be reduced in size, while ensuring the sealing performance of the oil pump.

According to the fifth aspect of the invention, since the pump cover is fixed by being pressed against the stepped portion of the wall portion due to fitting of the bearing to the third inner circumferential surface, the members used for fixing the pump cover can be reduced while ensuring the sealing performance of the oil pump.

According to the sixth aspect of the invention, since the pump cover is fixed by being fitted to the inner circumferential surface of the wall portion, the members used for fixing the pump cover can be reduced while ensuring the sealing performance of the oil pump.

According to the seventh aspect of the invention, since the case cover includes the intake oil passage and the discharge oil passage, the intake oil passage and the discharge oil passage are made up of respective holes formed in the case cover, so that the seal surfaces preventing oil leakage to the outside can be made smaller, and the oil pump is improved in durability and reliability.

According to the eighth aspect of the invention, the second power source is the rotating machine, and the second rotating shaft is the rotor shaft of the rotating machine. Therefore, the pump cover does not receive the weight of the rotating machine or the reaction force from the rotating machine due to supporting the rotating machine.

According to the ninth aspect of the invention, the sealing performance in the oil pump can be ensured with a simple structure in the vehicle drive device comprising the engine as the first power source, the electric transmission mechanism having the differential mechanism, the first rotating machine arranged coaxially with the first rotating shaft coupled to the engine and serving as the second power source controlling the differential state of the differential mechanism, and the second rotating machine arranged on the axis different from the first rotating shaft and coupled to the output rotating member of the electric transmission mechanism.

According to the tenth aspect of the present invention, the sealing performance in the oil pump can be ensured with a simple structure in the vehicle drive device comprising the engine as the first power source, the electric transmission mechanism having the differential mechanism, the first rotating machine controlling the differential state of the differential mechanism, and the second rotating machine coupled to the output rotating member of the electric transmission mechanism, wherein the second power source is the one rotating machine that is either one of the first rotating machine and the second rotating machine which are arranged coaxially with the first rotating shaft coupled to the engine.

DESCRIPTION OF THE PREFERRED EXAMPLES

Examples of the present invention will now be described in detail with reference to the drawings.

First Example

Figure 1:
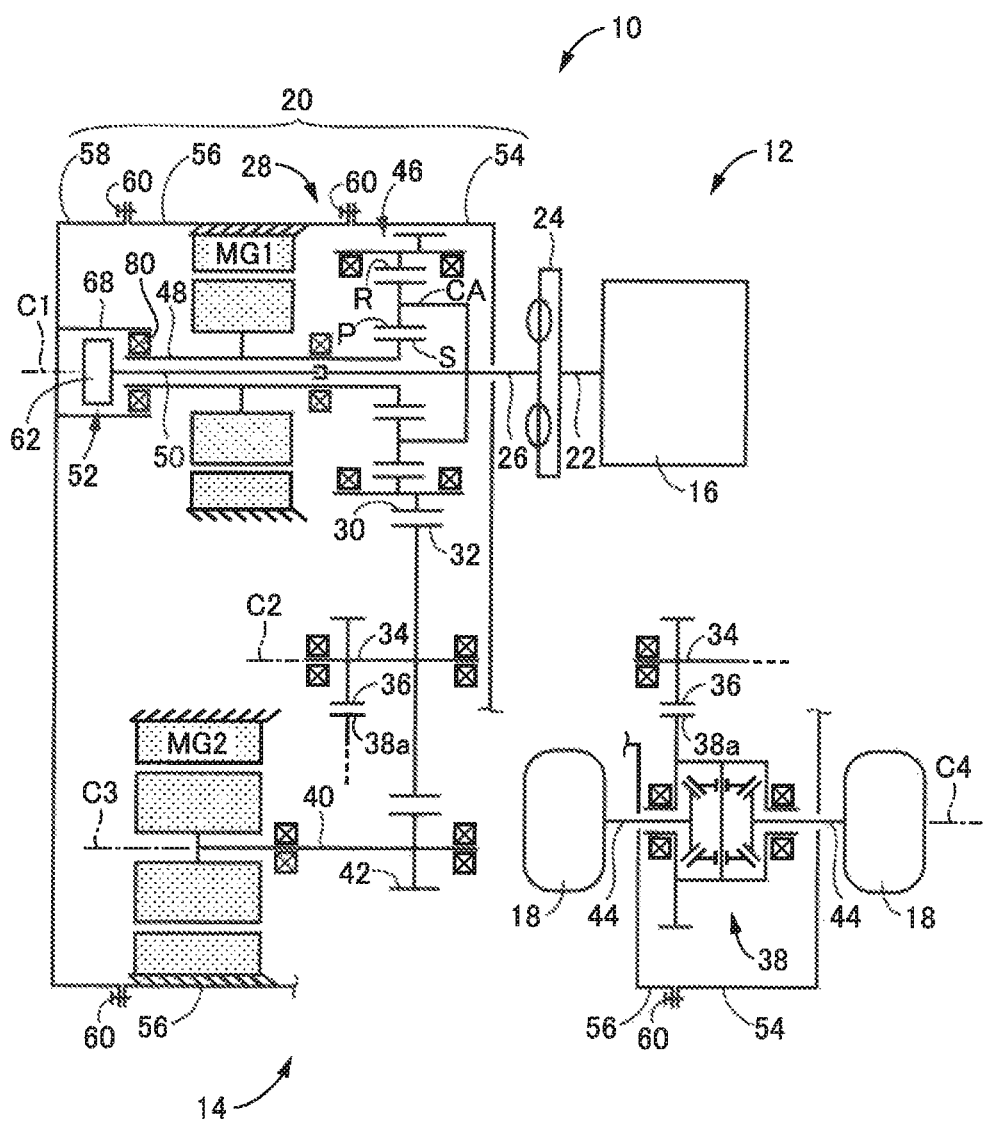
FIG. 1 is a diagram for explaining a schematic configuration of a vehicle drive device included in a vehicle to which the present invention is applied.

FIG. 1 is a diagram for explaining a schematic configuration of a vehicle drive device 12 included in a vehicle 10 to which the present invention is applied. In FIG. 1, the vehicle drive device 12 includes a power transmission device 14, an engine 16, a first rotating machine MG1, a second rotating machine MG2, drive wheels 18, a transaxle case 20, etc. The transaxle case 20 is a non-rotating member attached to a vehicle body.

The power transmission device 14 is disposed on a power transmission path between the engine 16 and the drive wheels 18. The power transmission device 14 includes a damper 24 coupled to a crankshaft 22 of the engine 16. The power transmission device 14 includes, in the transaxle case 20, an input shaft 26 coupled to the damper 24, a transmission portion 28 coupled to the input shaft 26, a driven gear 32 meshed with a drive gear 30 that is an output rotating member of the transmission portion 28, a driven shaft 34 to which the driven gear 32 is relatively non-rotatably fixed, a final gear 36 relatively non-rotatably fixed to the driven shaft 34, a differential gear 38 meshed with the final gear 36 via a differential ring gear 38a, a reduction gear 42 meshed with the driven gear 32 and coupled to a rotor shaft 40 of the second rotating machine MG2, etc. The power transmission device 14 further includes axles 44 etc. coupled to the differential gear 38. The final gear 36 has a smaller diameter than the driven gear 32. The reduction gear 42 has a smaller diameter than the driven gear 32. In the power transmission device 14 configured as described above, power of the engine 16 and power of the second rotating machine MG2 are transmitted to the driven gear 32 and transmitted from the driven gear 32 sequentially through the final gear 36, the differential gear 38, the axles 44, etc. to the drive wheels 18.

The power transmission device 14 is suitably used for a vehicle of an FF type, i.e., front-engine front-wheel drive type. The power transmission device 14 has a first axis C1, a second axis C2, a third axis C3, and a fourth axis C4. These four axes C1, C2, C3, C4 are parallel to each other. The first axis C1 is the axis of the input shaft 26 that is rotatably arranged, and the engine 16, the transmission portion 28, and the first rotating machine MG1 are arranged around the axis C1. The second axis C2 is the axis of the driven shaft 34, and the driven gear 32 and the final gear 36 are arranged around the axis C2. The third axis C3 is the axis of the rotor shaft 40 of the second rotating machine MG2, and the second rotating machine MG2 and the reduction gear 42 are disposed around the axis C3. The fourth axis C4 is the axis of the axles 44, and the differential gear 38 is disposed around the axis C4.

The transmission portion 28 has a planetary gear mechanism 46 as a power dividing mechanism dividing the power transmitted from the engine 16 through the input shaft 26 for the first rotating machine MG1 and the drive gear 30. The planetary gear mechanism 46 is a known single pinion type planetary gear device including a sun gear S, a pinion gear P, a carrier CA supporting the pinion gear P in a rotatable and revolvable manner, and a ring gear R meshed with the sun gear S via the pinion gear P. The planetary gear mechanism 46 functions as a differential mechanism generating a differential action. In the planetary gear mechanism 46, the sun gear S is coupled to a rotor shaft 48 of the first rotating machine MG1, the carrier CA is coupled to the engine 16 via the input shaft 26, and the ring gear R is formed on an inner circumferential surface of the drive gear 30.

The transmission portion 28 is an electronic transmission mechanism having the planetary gear mechanism 46 coupled to the engine 16 in a power transmittable manner and the first rotating machine MG1 coupled to the planetary gear mechanism 46 in a power transmittable manner such that a differential state of the planetary gear mechanism 46 is controlled through control of an operating state of the first rotating machine MG1. The second rotating machine MG2 is a rotating machine coupled to the driven gear 32 in a power transmittable manner. The driven gear 32 meshed with the drive gear 30 is an output rotating member of the transmission portion 28 along with the drive gear 30.

The vehicle 10 can perform hybrid running with a directly transmitted torque mechanically transmitted to the ring gear R by allowing the first rotating machine MG1 to receive a reaction force of an engine torque input to the carrier CA, and a second rotating machine torque output from the second rotating machine MG2 by driving the second rotating machine MG2 with electric power generated by the first rotating machine MG1. The vehicle 10 can also perform motor running with the second rotating machine torque when the second rotating machine MG2 is driven by electric power supplied from a battery not shown while operation of the engine 16 is stopped.

The vehicle drive device 12 further includes, in the transaxle case 20, a pump drive shaft 50 relatively non-rotatably coupled to the input shaft 26 by spline fitting, an oil pump 52 coupled to the pump drive shaft 50, etc. The oil pump 52 is driven by the engine 16 via the input shaft 26 and the pump drive shaft 50. The oil pump 52 is driven by the engine 16 to discharge oil used for lubricating portions of the power transmission device 14 including a ball bearing etc., and for cooling the first rotating machine MG1 and the second rotating machine MG2.

The transaxle case 20 includes a first case 54, a second case 56, and a case cover 58. The first case 54 is a bottomed cylindrical case housing the transmission portion 28, the driven gear 32, etc. The second case 56 is a cylindrical case housing the first rotating machine MG1 and the second rotating machine MG2. The first case 54 and the second case 56 are integrally coupled by fasteners 60 such as bolts so that an opened portion of the first case 54 and an opened portion of the second case 56 on the side facing the engine 16 are joined together. The case cover 58 is a case cover disposed to close an opened portion of the second case 56 on the side opposite to the engine 16. The second case 56 and the case cover 58 are integrally coupled by the fasteners 60.

In the vehicle drive device 12, a first power source is the engine 16. The first rotating machine MG1 can mechanically transmit the directly transmitted torque to the ring gear R by receiving the reaction force of the engine torque and therefore can be regarded also as a power source. A second power source is the first rotating machine MG1 arranged on the first axis C1 coaxial with the pump drive shaft 50. A first rotating shaft coupled to the engine 16 is the pump drive shaft 50. A second rotating shaft coupled to the first rotating machine MG1 is the rotor shaft 48 of the first rotating machine MG1. The second rotating machine MG2 is arranged on the third axis C3 which is an axis different from the pump drive shaft 50. The oil pump 52 has a pump gear 62 coupled to the pump drive shaft 50 on one axial end side of the pump drive shaft 50, i.e., on the side opposite to the engine 16. The second case 56 is a case opened on the one axial end side of the pump drive shaft 50 and housing the first rotating machine MG1. The case cover 58 is a case cover disposed to close the opened portion of the second case 56 on the one axial end side.

Figure 2:
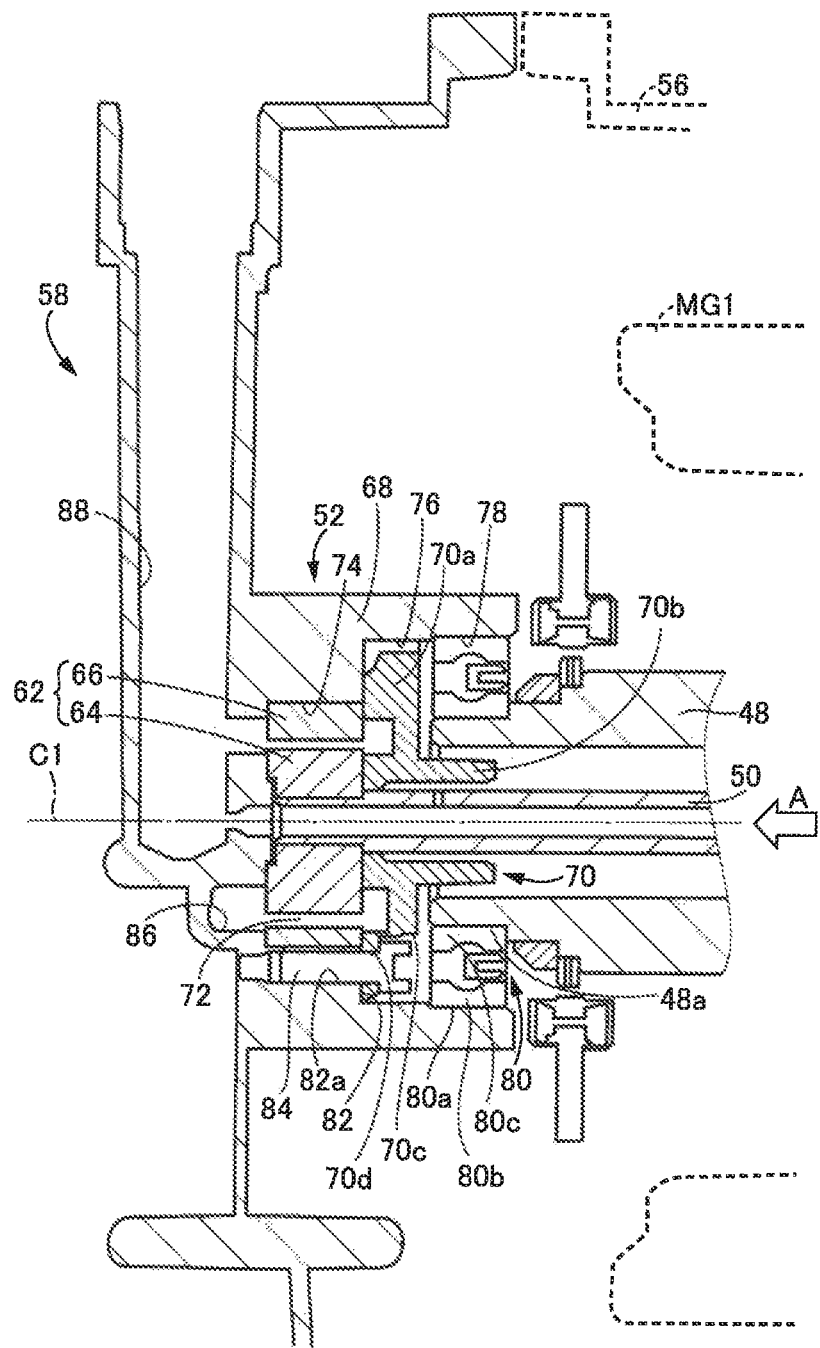
FIG. 2 is a cross-sectional view for explaining a configuration of an oil pump, a configuration of a case cover around the oil pump, etc.
Figure 3:
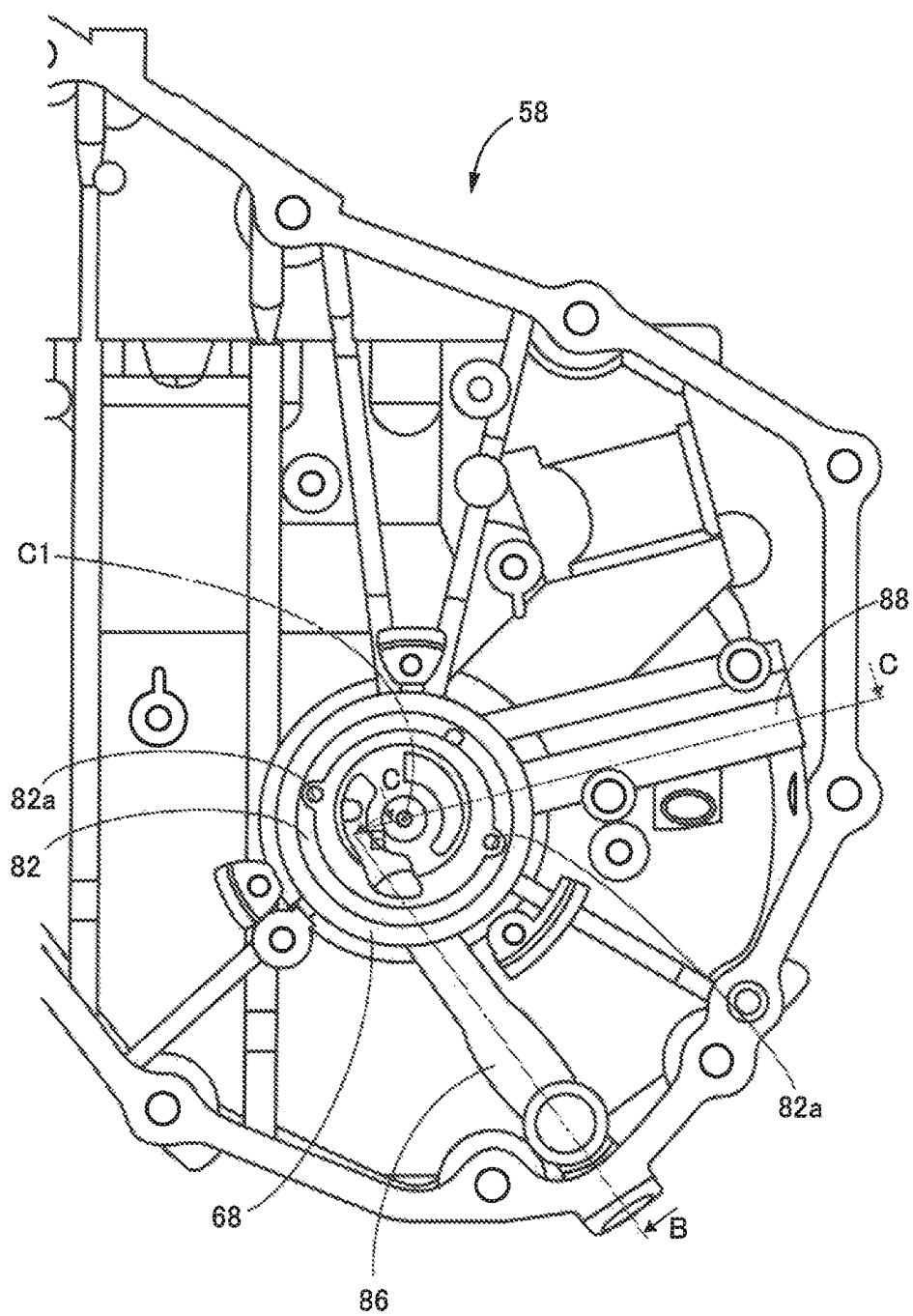
FIG. 3 is an external view on arrow A of the case cover shown in FIG. 2.
Figure 4:
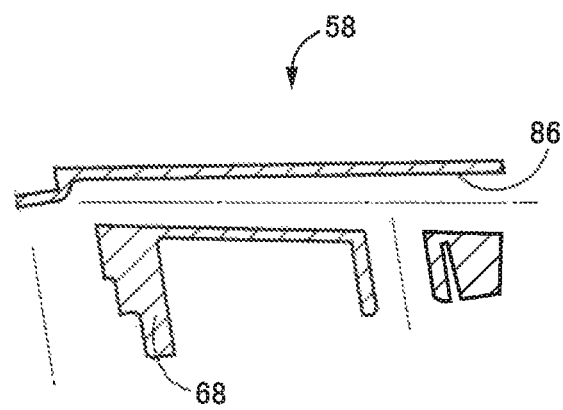
FIG. 4 is a cross-sectional view taken along a line B-B in the external view on arrow A shown in FIG. 3.
Figure 5:
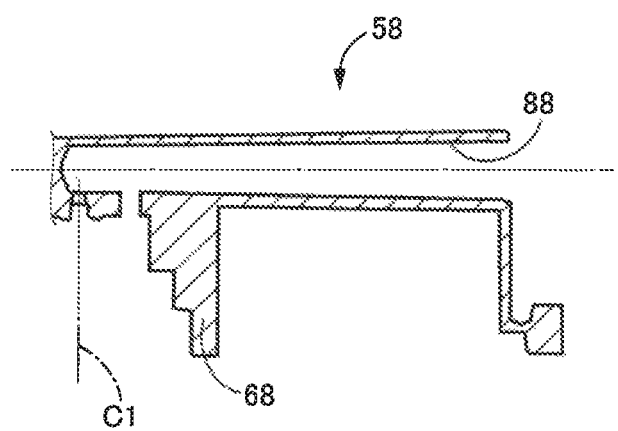
FIG. 5 is a cross-sectional view taken along a line C-C in the external view on arrow A shown in FIG. 3.

Configurations of the oil pump 52, the case cover 58, etc. will be described with reference to FIGS. 2 to 5. FIG. 2 is a cross-sectional view for explaining the configuration of the oil pump 52, the configuration of the case cover 58 around the oil pump 52, etc. FIG. 3 is an external view of the case cover 58 as seen from the engine 16 side in the axial direction of the pump drive shaft 50. Therefore, FIG. 3 is an external view on arrow A of the case cover 58 shown in FIG. 2. FIG. 4 is a cross-sectional view taken along a line B-B in the external view on arrow A shown in FIG. 3. FIG. 5 is a cross-sectional view taken along a line C-C in the external view on arrow A shown in FIG. 3.

The oil pump 52 has a drive rotor 64 and a driven rotor 66 as the pump gear 62. The drive rotor 64 is coupled to the pump drive shaft 50 on the one axial end side of the pump drive shaft 50, i.e., on the side opposite to the engine 16. The drive rotor 64 has outer circumferential teeth. The driven rotor 66 has an annular shape and has inner circumferential teeth meshed with the outer circumferential teeth of the drive rotor 64. The oil pump 52 is an internal gear type oil pump having the drive rotor 64 and the driven rotor 66 meshed with each other.

The case cover 58 has a cylindrical wall portion 68 formed circumferentially in an outside space of the pump drive shaft 50 and projecting toward the second case 56 parallel to the axial direction of the pump drive shaft 50. The wall portion 68 is opened on the side facing the second case 56. The oil pump 52 has a pump cover 70 and a pump chamber 72. The pump cover 70 is arranged in a space radially inside the wall portion 68. The pump cover 70 has a disk-shaped main body portion 70a and a cylindrical cylinder portion 70b projecting toward the second case 56 parallel to the axial direction of the pump drive shaft 50 at the radially inner side of the main body portion 70a. The cylinder portion 70b is fitted into the pump drive shaft 50. The pump chamber 72 is formed in a space radially inside the wall portion 68 by the case cover 58 including the wall portion 68 and the pump cover 70. In other words, the pump chamber 72 is formed in a space radially inside the wall portion 68 between a portion of the case cover 58 serving as a bottom portion of the wall portion 68 and the pump cover 70. The pump chamber 72 is a space housing the pump gear 62.

The wall portion 68 is provided with a first inner circumferential surface 74, a second inner circumferential surface 76, and a third inner circumferential surface 78. The pump chamber 72 is formed in the space on the radially inner side of the first inner circumferential surface 74.

The second inner circumferential surface 76 is disposed next to the first inner circumferential surface 74 on the other axial end side of the pump drive shaft 50, i.e., on the side facing the engine 16, relative to the first inner circumferential surface 74. The second inner circumferential surface 76 has a larger diameter than the first inner circumferential surface 74. The second inner circumferential surface 76 houses the pump cover 70 in the space on the radially inner side. Particularly, the main body portion 70a of the pump cover 70 is fitted into the space on the radially inner side of the second inner circumferential surface 76.

The third inner circumferential surface 78 is disposed next to the second inner circumferential surface 76 on the other axial end side of the pump drive shaft 50 relative to the pump cover 70. The third inner circumferential surface 78 has a bearing 80 fitted thereto and functions as a support portion rotatably supporting the rotor shaft 48 of the first rotating machine MG1 via the bearing 80. Therefore, the wall portion 68 includes the support portion as described above. An outer circumferential surface 80a of the bearing 80 is fitted to the third inner circumferential surface 78. For example, the bearing 80 has an outer race 80b press-fitted to the third inner circumferential surface 78 and thereby completely fixed to the third inner circumferential surface 78. The bearing 80 has an inner race 80c fitted to an outer circumferential surface 48a of the rotor shaft 48 of the first rotating machine MG1 on one axial end side, i.e., on the side facing the case cover 58. The third inner circumferential surface 78 has a larger diameter than the second inner circumferential surface 76. In other words, the second inner circumferential surface 76 has a smaller diameter than the third inner circumferential surface 78. Therefore, the outer diameter of the main body portion 70a of the pump cover 70 is smaller than the outer diameter of the bearing 80.

A stepped portion 82 is formed in the space radially inside the wall portion 68 formed by a difference between diameters of the first inner circumferential surface 74 and the second inner circumferential surface 76. The main body portion 70a of the pump cover 70 has notches 70c formed at multiple positions on the radially outer circumferential side and facing the stepped portion 82 of the wall portion 68. In the notches 70c, screws (bolts) 84 are fastened into screw holes 82a formed in the stepped portion 82 of the wall portion 68 through holes 70d formed in the notches 70c, so that the pump cover 70 is fixed to the stepped portion 82 by the bolts 84. The pump gear 62 is arranged in the pump chamber 72 and is sandwiched between the pump cover 70 and the case cover 58.

The case cover 58 has an intake oil passage 86 formed in communication with an intake port of the oil pump 52 to allow an oil sucked by the oil pump 52 to flow therethrough and a discharge oil passage 88 formed in communication with a discharge port of the oil pump 52 to allow an oil discharged by the oil pump 52 to flow therethrough.

Figure 8:
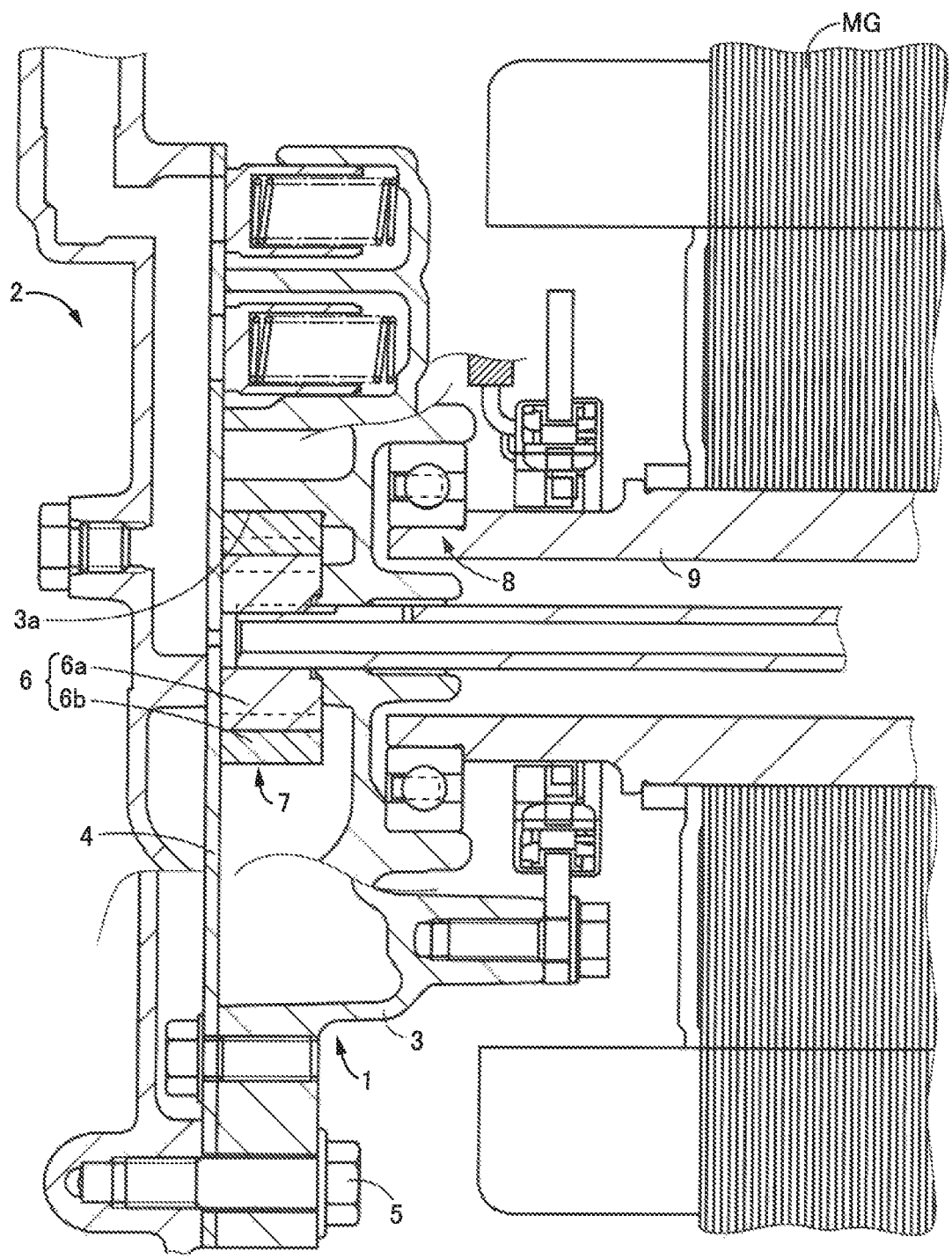
FIG. 8 is a cross-sectional view for explaining a configuration of an oil pump, a configuration of a case cover around the oil pump, etc. in a comparative example.

FIG. 8 is a cross-sectional view for explaining a configuration of an oil pump 1, a configuration of a case cover 2 around the oil pump 1, etc. in a comparative example. In a vehicle of the comparative example of FIG. 8, a pump body 3 provided with a cylindrical recess portion 3*a* is fixed to a case cover 2 via a plate 4 by a bolt 5 so that a pump chamber 7 housing a pump gear 6 is formed by the recess portion 3*a*. The pump gear 6 has a drive gear 6*a* and a driven gear 6*b*. The pump body 3 rotatably supports a rotor shaft 9 of a rotating machine MG serving as a power source via a bearing 8.

In the comparative example shown in FIG. 8, since the pump body 3 rotatably supports the rotor shaft 9 of the rotating machine MG via the bearing 8, a reaction force from the rotating machine MG is transmitted to the bearing 8, the pump body 3, and the case cover 2 in this order. Therefore, the pump body 3 requires strength and rigidity to support the rotating machine MG Additionally, a seal member such as the plate 4 must be disposed between the pump body 3 and the case cover 2 to ensure a sealing performance at mating surfaces of the pump body 3 and the case cover 2. Alternatively, it is required to increase a fastening force for fixing the pump body 3 and the case cover 2.

In this example, since the case cover 58 rotatably supports the rotor shaft 48 of the first rotating machine MG1 via the bearing 80, the reaction force from the first rotating machine MG1 is transmitted by the bearing 80 and the case cover 58 in this order. This example provides a structure in which the pump cover 70 does not receive the weight of the first rotating machine MG1 or the reaction force from the first rotating machine MG1. This suppresses an increase in the size of the pump cover 70. Additionally, this eliminates the need for providing a seal member to ensure the sealing performance of the mating surfaces of the pump cover 70 and the case cover 58. In this example, the mating surfaces of the pump cover 70 and the case cover 58 are the mating surfaces of the pump cover 70 and the stepped portion 82 of the wall portion 68. Additionally due to the presence of this mating surfaces inside the transaxle case 20, the sealing performance of the mating surfaces can be secured by a simple structure using only a small number of the small bolts 84.

As described above, according to this example, the oil pump 52 allows the case cover 58 including the wall portion 68 and the pump cover 70 arranged in the space radially inside the wall portion 68 to form the pump chamber 72 housing the pump gear 62 in the space radially inside the wall portion 68, while the wall portion 68 formed in the case cover 58 includes the third inner circumferential surface 78 that is the support portion rotatably supporting the rotor shaft 48 of the first rotating machine MG1 via the bearing 80, and therefore, the pump cover 70 does not receive the weight of the first rotating machine MG1 or the reaction force from the first rotating machine MG1 due to supporting the first rotating machine MG1, and seal surfaces defined as the mating surfaces between the case cover 58 and the pump cover 70 are present inside the transaxle case 20 that is the entire case formed by the case cover 58, the second case 56, etc. Thus, the sealing performance of the oil pump 52 can be ensured by a simple structure.

According to this example, since the wall portion 68 is provided with the first inner circumferential surface 74 with which the pump chamber 72 is formed on the radially inner side thereof and the second inner circumferential surface 76 disposed next to the first inner circumferential surface 74 and having a larger diameter than the first inner circumferential surface 74 with the pump cover 70 housed in the space on the radially inner side thereof, the oil pump 52 is properly configured with a structure in which the pump cover 70 does not receive the reaction force from the first rotating machine MG1 etc.

According to this example, since the support portion supporting the rotor shaft 48 of the first rotating machine MG1 is the third inner circumferential surface 78 of the wall portion 68 into which the outer circumferential surface 80*a* of the bearing 80 is fitted, and the second inner circumferential surface 76 has a smaller diameter than the third inner circumferential surface 78, the oil pump 52 is properly configured with a structure in which the pump cover 70 does not receive the reaction force from the first rotating machine MG1 etc.

According to this example, since the pump cover 70 is fixed to the stepped portion 82 of the wall portion 68 by the bolts 84 and therefore has a structure in which the bolts 84 used for fixing the pump cover 70 do not receive the reaction force from the first rotating machine MG1 etc., the number of the bolts 84 can be reduced, or the bolts 84 can be reduced in size, while ensuring the sealing performance of the oil pump 52.

According to this example, since the case cover 58 includes the intake oil passage 86 and the discharge oil passage 88, the intake oil passage 86 and the discharge oil passage 88 are made up of respective holes formed in the case cover 58, so that the seal surfaces preventing oil leakage to the outside can be made smaller, and the oil pump 52 is improved in durability and reliability.

Other examples of the present invention will be described. In the following description, the portions common to the examples are denoted by the same reference numerals and descriptions thereof will be omitted.

Second Example

In the first example, the pump cover 70 is fixed to the stepped portion 82 of the wall portion 68 by the bolts 84. In this second example, it is proposed that a pump cover 94 is fixed to the stepped portion 82 without using the bolts 84.

Figure 6:
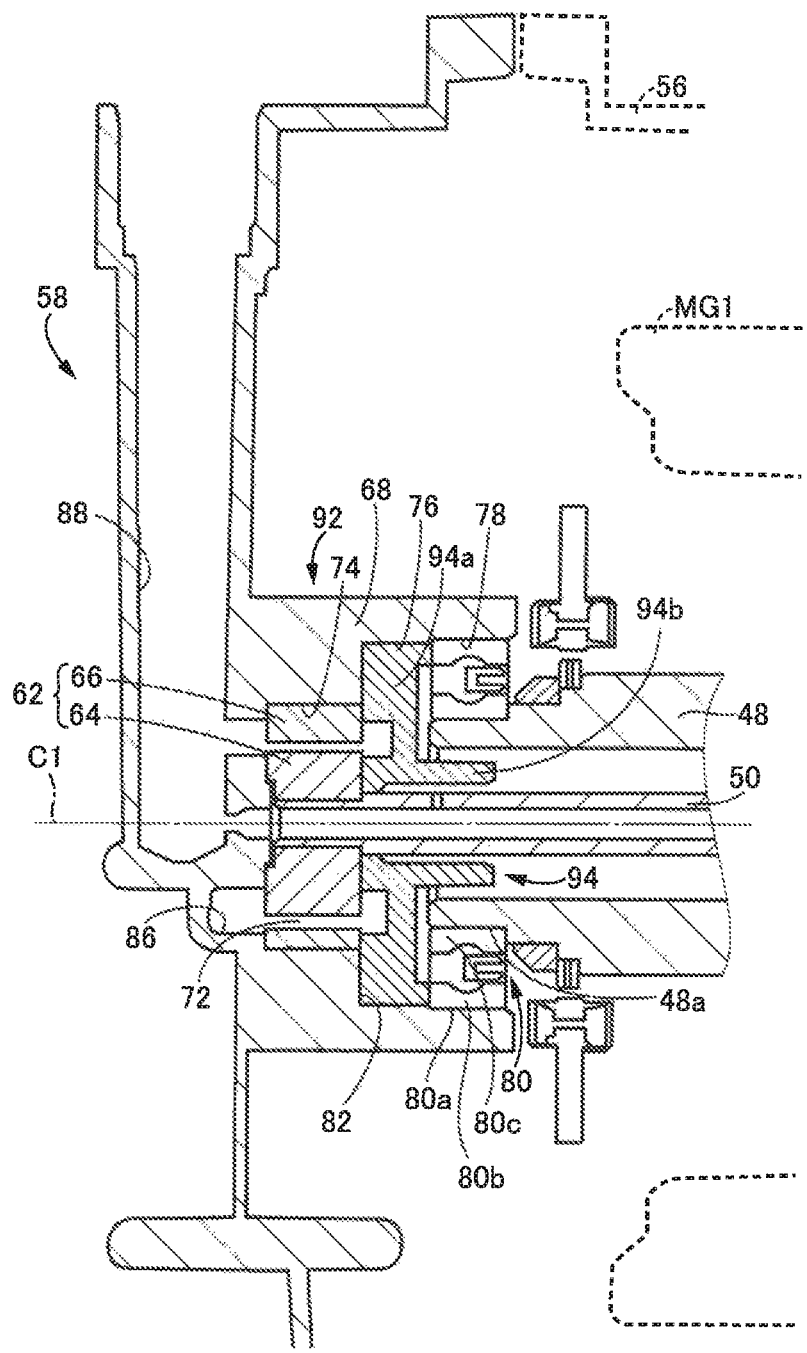
FIG. 6 is a cross-sectional view for explaining a configuration of an oil pump, a configuration of the case cover around the oil pump, etc. in an example different from FIG. 2.

FIG. 6 is a cross-sectional view for explaining a configuration of an oil pump 92, a configuration of the case cover 58 around the oil pump 92, etc. in an example different from FIG. 2. In FIG. 6, the oil pump 92 has the pump cover 94. The pump cover 94 is arranged in a space radially inside the wall portion 68. The pump cover 94 has a disk-shaped main body portion 94*a* and a cylindrical cylinder portion 94*b* projecting toward the second case 56 parallel to the axial direction of the pump drive shaft 50 at the radially inner side of the main body portion 94*a*. In the main body portion 94*a* of the pump cover 94, the notches 70*c* in the first example are not formed.

The main body portion 94*a* of the pump cover 94 is loosely fitted into the space radially inside the second inner circumferential surface 76. The pump cover 94 is fixed by the bearing 80 fitted into the third inner circumferential surface 78 such that the bearing presses the pump cover 94 against the stepped portion 82 of the wall portion 68. In other words, the pump cover 94 is fixed by the bearing 80 pressing the main body portion 94*a* of the pump cover 94 against the stepped portion 82.

Since the pump cover 94 is pressed by the bearing 80, the pump cover 94 may receive a thrust force, i.e., a force in a thrust direction of the reaction force of the first rotating machine MG1. The configuration of the vehicle drive device 12 of this example has a mechanism in which the thrust force is not applied to the bearing 80, and consequently, the pump cover 94 does not receive the reaction force from the first rotating machine MG1. Alternatively, even if the thrust force is applied to the bearing 80, the magnitude of the thrust force is small, thus, the influence of the reaction force received by the pump cover 94 from the first rotating machine MG1 is small.

According to this example, the same effects as the first example described above can be obtained. Particularly, since the pump cover 94 is fixed by being pressed against the stepped portion 82 of the wall portion 68 due to fitting of the bearing 80 to the third inner circumferential surface 78, the members used for fixing the pump cover 94 can be reduced while ensuring the sealing performance of the oil pump 92.

Third Example

In the second example, in FIG. 6, the pump cover 94 is fixed by the bearing 80 pressing the main body portion 94a of the pump cover 94 against the stepped portion 82. In this example, instead of the second example, the pump cover 94 is fixed by being fitted to the inner circumferential surface of the wall portion 68. Specifically, the main body portion 94a of the pump cover 94 is firmly fitted by press-fitting into the space radially inside the second inner circumferential surface 76. In other words, the pump cover 94 has the main body portion 94a press-fitted to the second inner circumferential surface 76 and is thereby completely fixed to the second inner circumferential surface 76. In this case, the pump cover 94 need not be pressed against the stepped portion 82 by the bearing 80.

According to this example, the same effects as the first and second examples can be obtained. Particularly, since the pump cover 94 is fixed by being fitted to the second inner circumferential surface 76 that is one of the inner circumferential surfaces of the wall portion 68, the members used for fixing the pump cover 94 can be reduced while ensuring the sealing performance of the oil pump 92.

Although the examples of the present invention have been described in detail with reference to the drawings, the present invention is also applied in other forms.

For example, the vehicle drive device 12 illustrated in the examples described above has the second rotating machine MG2 arranged on the third axis C3 that is on the axis different from the pump drive shaft 50; however, the present invention is not limited to this form. For example, as shown in a vehicle drive device 100 of FIG. 7, the second rotating machine MG2 may be arranged coaxially with the pump drive shaft 50 similarly to the first rotating machine MG1. In the vehicle drive device 100 shown in FIG. 7, the wall portion 68 formed in the case cover 58 rotatably supports the rotor shaft 40 of the second rotating machine MG2 via the bearing 80. Therefore, in the vehicle drive device 100, the second power source is the second rotating machine MG2 arranged coaxially with the pump drive shaft 50. The second rotating shaft coupled to the second rotating machine MG2 is the rotor shaft 40 of the second rotating machine MG2.

Figure 7:
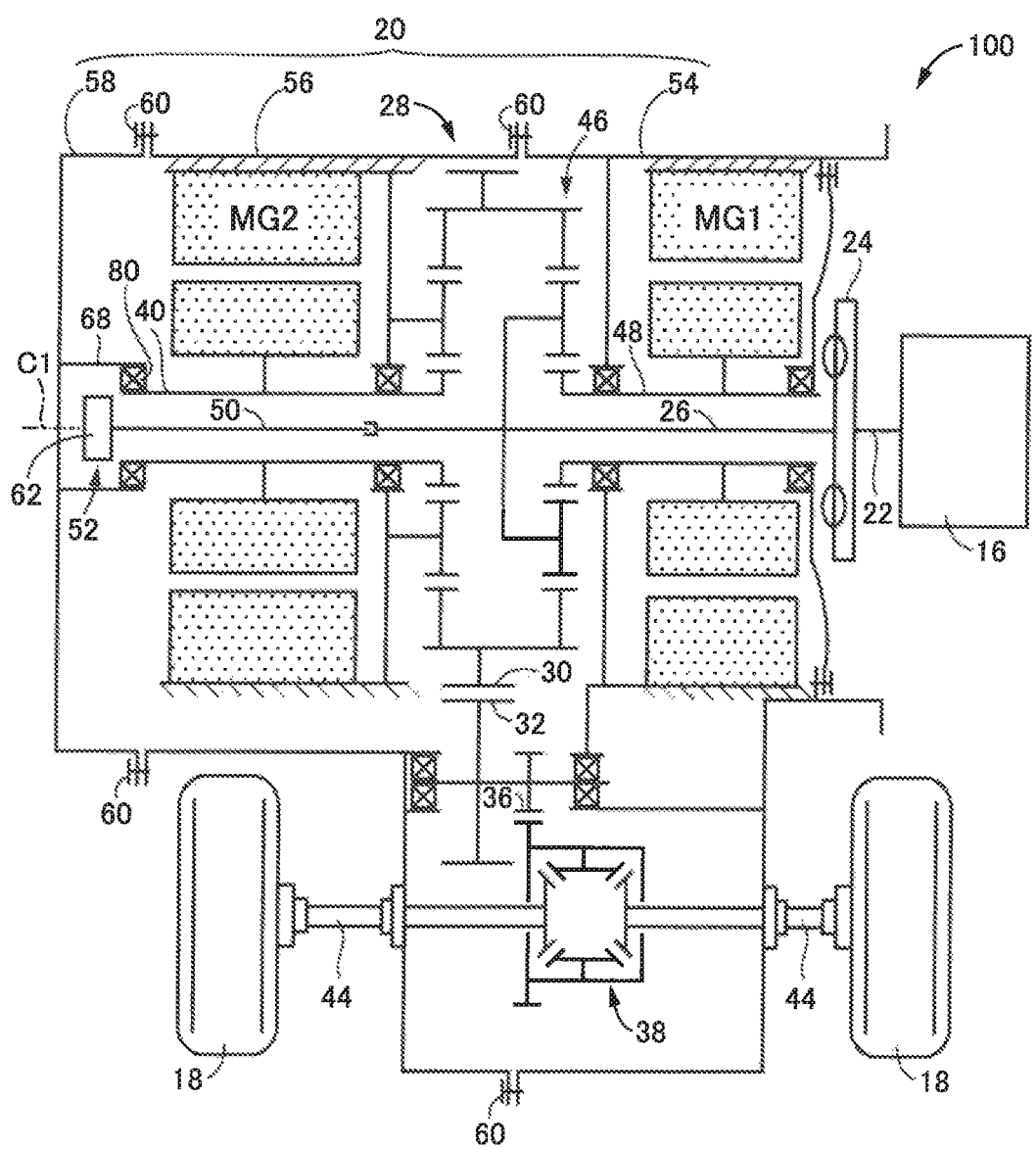
FIG. 7 is a diagram for explaining a schematic configuration of a vehicle drive device to which the present invention is applied, showing a vehicle drive device different from the vehicle drive device of FIG. 1.

The vehicle drive device 100 of FIG. 7 can employ an embodiment in which the first rotating machine MG1 is arranged on the case cover 58 side relative to the planetary gear mechanism 46 while the drive gear 30, the driven gear 32, and the second rotating machine MG2 are arranged on the engine 16 side relative to the planetary gear mechanism 46. In this case, the wall portion 68 formed in the case cover 58 rotatably supports the rotor shaft 48 of the first rotating machine MG1 via the bearing 80. Therefore, in the vehicle drive device 100 including the first rotating machine MG1 and the second rotating machine MG2 arranged coaxially with the pump drive shaft 50, the second power source is one rotating machine that is either the first rotating machine MG1 or the second rotating machine MG2, and the second rotating shaft is the rotor shaft of the one rotating machine.

Although the vehicle drive devices 12, 100 illustrated in the examples described above include the engine 16, the first rotating machine MG1, and the second rotating machine MG2, the present invention is not limited to this form. For example, the vehicle drive device may be a vehicle drive device of a parallel hybrid vehicle in which an engine and a rotating machine function as a power source. Alternatively, the vehicle drive device may be a vehicle drive device of a series hybrid vehicle including an engine and a rotating machine driven by electric power generated by the engine and electric power from a battery. In any of these vehicle drive devices, the oil pump is driven by the engine. The wall portion 68 formed in the case cover 58 rotatably supports the rotor shaft of the rotating machine via the bearing 80. Therefore, the second power source is the rotating machine, and the second rotating shaft is the rotor shaft of the rotating machine. Even in such a vehicle drive device, the pump cover 70 does not receive the weight of the rotating machine or the reaction force from the rotating machine due to supporting the rotating machine.

In the examples described above, the first case 54 and the second case 56 may be one integrally formed case. Both the first power source and the second power source may be rotating machines. The input shaft 26 and the pump drive shaft 50 may be one rotating shaft. Therefore, the first rotating shaft may be a rotating shaft coupled to the first power source. The case housing the second power source may be opened at least on the one axial end side of the first rotating shaft coupled to the first power source.

In the examples described above, the second inner circumferential surface 76 and the third inner circumferential surface 78 may have the same diameter.

In the examples described above, the vehicle drive device 12 includes the transmission portion 28 having the planetary gear mechanism 46 that is a single pinion type planetary gear device and functioning as an electric transmission mechanism; however, the present invention is not limited to this form. For example, the vehicle drive device 12 may include an automatic transmission disposed on the power transmission path between the transmission portion 28 and the drive wheels 18 in series with the transmission portion 28. The transmission portion 28 may be a transmission mechanism having a differential action restricted through control of clutches or brakes coupled to the sun gear S, the carrier CA, and the ring gear R that are the rotating elements of the planetary gear mechanism 46. The planetary gear mechanism 46 may be a double pinion type planetary gear device. The planetary gear mechanism 46 may be a differential gear device in which a pinion rotationally driven by the engine 16 and a pair of bevel gears meshed with the pinion are operatively coupled to the first rotating machine MG1 and the drive gear 30. The planetary gear mechanism 46 may be comprised of two or more planetary gear devices coupled to each other by coupling rotating elements constituting each of the two or more planetary gear devices and such that an engine, a rotating machine, and drive wheels are respectively coupled to other rotating elements of the two or more planetary gear devices in a power transmittable manner.

Although the oil pump 52 is an internal gear type oil pump in the examples described above, the present invention is not limited to this form. For example, the oil pump 52 may be of an external gear type in which outer circumferential teeth of a drive gear are meshed with outer circumferential teeth of a driven gear.

In the examples described above, the present invention is applied to the vehicle drive device 12 suitably used for the FF type vehicle; however, the present invention is also appropriately applicable to a power transmission device used in vehicles of other types such as an RR (rear-engine rear-wheel drive) type, for example.

The above description is merely an embodiment, and the present invention can be implemented in variously modified and improved forms based on the knowledge of those skilled in the art.

REFERENCE SIGNS LIST

12: Vehicle drive device
16: Engine (First power source)
28: Transmission portion (Electric transmission mechanism)
46: Planetary gear mechanism (Differential mechanism)
48: Rotator shaft (Second rotating shaft)
50: Pump drive shaft (First rotating shaft)
52: Oil pump
56: Second case (Case)
58: Case cover
62: Pump gear
68: Wall portion
70: Pump cover
72: Pump chamber
74: First inner circumferential surface
76: Second inner circumferential surface
78: Third inner circumferential surface (Support portion)
80: Bearing
80a: Outer circumferential surface
82: Stepped portion
84: Bolt
86: Intake oil passage
88: Discharge oil passage
MG1: First rotating machine (Second power source)
MG2: Second rotating machine
100: Vehicle drive device
40: Rotor shaft (Second rotating shaft)
MG2: Second rotating machine (Second power source)

What is claimed is:

1. A vehicle drive device comprising: a first power source; a second power source; a first rotating shaft coupled to the first power source; a second rotating shaft coupled to the second power source; an oil pump driven by the first power source and including a pump gear coupled to the first rotating shaft on one axial end side of the first rotating shaft; a case opened at least on the one axial end side of the first rotating shaft and housing the second power source; and a case cover disposed to close an opened portion of the case, wherein
the case cover includes a cylindrical wall portion formed circumferentially in an outside space of the first rotating shaft and projecting toward the case parallel to an axial direction of the first rotating shaft, wherein
the oil pump includes a pump cover arranged in a space radially inside the wall portion and a pump chamber formed in a space radially inside the wall portion by the case cover including the wall portion and the pump cover to house the pump gear, and wherein
the wall portion includes a support portion disposed on the other axial end side of the first rotating shaft relative to the pump cover, having a bearing fitted thereto, and rotatably supporting the second rotating shaft via the bearing.

2. The vehicle drive device according to claim 1, wherein the wall portion is provided with a first inner circumferential surface having the pump chamber formed in a space on the radially inner side and a second inner circumferential surface disposed next to the first inner circumferential surface on the other axial end side of the first rotating shaft relative to the first inner circumferential surface, having a larger diameter than the first inner circumferential surface, and housing the pump cover in a space on the radially inner side.

3. The vehicle drive device according to claim 2, wherein
the support portion is a third inner circumferential surface of the wall portion to which an outer circumferential surface of the bearing is fitted, and wherein
the second inner circumferential surface has a smaller diameter than the third inner circumferential surface.

4. The vehicle drive device according to claim 2, wherein the pump cover is fixed by a bolt to a stepped portion of the wall portion formed by a difference between the diameters of the first inner circumferential surface and the second inner circumferential surface.

5. The vehicle drive device according to claim 2, wherein
the support portion is a third inner circumferential surface of the wall portion to which an outer circumferential surface of the bearing is fitted, and wherein
the pump cover is fixed by the bearing that is fitted to the third inner circumferential surface such that the bearing presses the pump cover against a stepped portion of the wall portion formed by a difference between the diameters of the first inner circumferential surface and the second inner circumferential surface.

6. The vehicle drive device according to claim 1, wherein the pump cover is fixed by being fitted to an inner circumferential surface of the wall portion.

7. The vehicle drive device according to claim 1, wherein the case cover has an intake oil passage formed in communication with an intake port of the oil pump to allow an oil sucked by the oil pump to flow therethrough and a discharge oil passage formed in communication with a discharge port of the oil pump to allow an oil discharged by the oil pump to flow therethrough.

8. The vehicle drive device according to claim 1, wherein
the second power source is a rotating machine, and
the second rotating shaft is a rotor shaft of the rotating machine.

9. The vehicle drive device according to claim 1, further comprising an engine, an electric transmission mechanism including a differential mechanism coupled to the engine in a power transmittable manner and a first rotating machine coupled to the differential mechanism in a power transmittable manner such that a differential state of the differential mechanism is controlled through control of an operating state of the first rotating machine, and a second rotating machine coupled to an output rotating member of the electric transmission mechanism in a power transmittable manner, wherein
the first power source is the engine,
the second power source is the first rotating machine arranged coaxially with the first rotating shaft,
the second rotating shaft is a rotor shaft of the first rotating machine, and
the second rotating machine is arranged on an axis different from the first rotating shaft.

10. The vehicle drive device according to claim 1, further comprising an engine, an electric transmission mechanism including a differential mechanism coupled to the engine in a power transmittable manner and a first rotating machine coupled to the differential mechanism in a power transmittable manner such that a differential state of the differential mechanism is controlled through control of an operating state of the first rotating machine, and a second rotating machine coupled to an output rotating member of the electric transmission mechanism in a power transmittable manner, wherein
    the first power source is the engine,
    the second power source is one rotating machine that is either one of the first rotating machine and the second rotating machine which are arranged coaxially with the first rotating shaft, and
    the second rotating shaft is a rotor shaft of the one rotating machine.

\* \* \* \* \*